United States Patent [19]

Todoroki et al.

[11] Patent Number: 4,833,926
[45] Date of Patent: May 30, 1989

[54] MAGNETOSTRICTIVE STRESS MESUREMENT APPARATUS

[75] Inventors: Masaki Todoroki, Machida; Masasi Watanabe; Hiroyuki Aoki, both of Yokohama, all of Japan

[73] Assignee: Nissan Motor Co., Ltd., Yokohama, Japan

[21] Appl. No.: 225,391

[22] Filed: Jul. 28, 1988

[30] Foreign Application Priority Data

Jul. 29, 1987 [JP] Japan .................... 62-189255
Jul. 31, 1987 [JP] Japan .................... 62-191881

[51] Int. Cl.$^4$ ................................ G01L 1/12
[52] U.S. Cl. ...................... 73/862.04; 73/862.36; 73/862.69
[58] Field of Search .......... 73/862.49, 862.05, 862.04, 73/862.06, 862.36, DIG. 2

[56] References Cited

U.S. PATENT DOCUMENTS 2,053,560 9/1936 Janovsky ............................ 73/862.69

FOREIGN PATENT DOCUMENTS 142110 5/1985 European Pat. Off. ......... 73/862.69
59-77326 5/1984 Japan .
236041 11/1985 Japan ............................ 73/862.36
1323873 7/1987 U.S.S.R. ........................ 73/862.69

Primary Examiner—Joseph A. Orsino
Assistant Examiner—Hollis T. Chen
Attorney, Agent, or Firm—Foley & Lardner, Schwartz, Jeffery, Schwaab, Mack, Blumenthal & Evans

[57] ABSTRACT

To simultaneously measure the magnitudes and directions of both axial and torsional stresses produced in a shaft made of magnetostrictive material and provided with first and second sensing segment areas formed in mirror symmetrical arrangement along an outer circumferential surface thereof, the magnetostrictive stress measurement apparatus comprises a first coil provided around the first sensing segment area; a first bridge circuit for detecting change in inductance of the first coil; and a second coil provided around the second sensing segment area; a second bridge circuit for detecting change in inductance of the second coil; and a calculator for calculating an addition of a first inductance change detected by the first bridge circuit and a second inductance change detected by the second bridge circuit to detect an axial stress and a subtraction between the first and second inductance changes to detect a torsional stress.

5 Claims, 6 Drawing Sheets

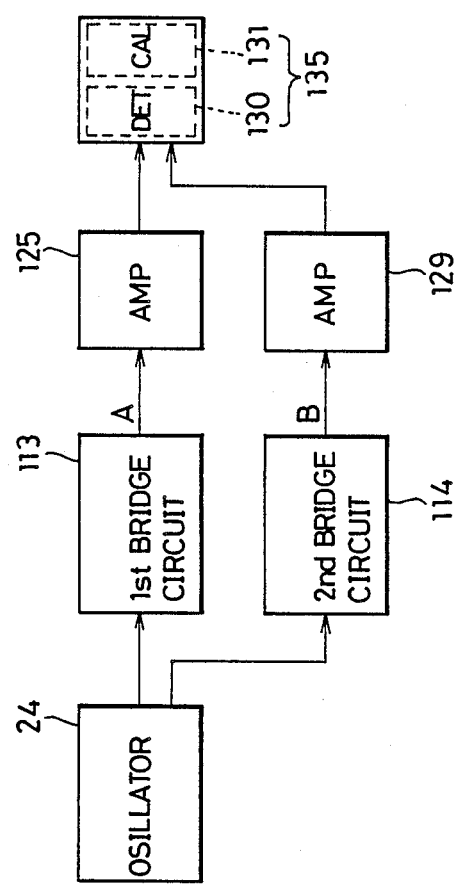

MAGNETOSTRICTIVE STRESS MEASUREMENT APPARATUS

BACKGROUND OF THE INVENTION

1. Field of the Invention

The present invention relates to a magnetostrictive stress measurement apparatus and more specifically to a stress measurement apparatus for simultaneously measuring both axial and torsional stressess producerd in a shaft made of a magnetostrictive material.

2. Description of the Prior Art

The present invention is relevant to a pending application (U.S. Ser. No. 011,330) filed Feb. 5, 1987 by the same applicant, entitled MAGNETOSTRICTIVE DEVICE FOR MEASURING TORSIONAL TORQUE.

In the device disclosed in the above application, two, first and second, sensing segment areas for detecting torsional stress produced in a shaft to be measured on the basis of magnetostrictive effect are arranged in V-shaped on the circumferential surface of the shaft at a predetermined angle with respect to the axial direction of the shaft, and a pair of magnetizing coil and detecting coil are loosely arranged around the first and second sensing segment areas. Therefore, when a torsional stress is produced in the shaft under the condition that current is passed through each of these coils, since each inductance of the two coils changes on the basis of magnetostrictive effect at the first and second sensing segment areas, it is possible to separately measure the magnitude and the direction of only a torsional stress produced in the shaft on the basis of change in inductance of each detecting coil.

The above-mentioned magnetostrictive stress measurement apparatus can be mounted on an industrial robot for effecting automated grinding work, for instance. In this case, the first and second sensing segment areas are formed on the outer circumferential surface of a motor shaft provided with a grinding stone at a free end thereof, and a sensor signal representative of a torsional stress produced in the motor shaft is inputted to a robot controller to control the motor speed, for instance.

In the above-mentioned magnetostricitve device, however, although a torsional stress produced in the shaft can be measured, since it is impossible to simultaneously measure the magnitudes and directions of both axial and torsional stress produced in the motor shaft to be controlled, there exists a problem in that it is impossible to appropriately control the pressure of the grinding stone against a workpiece to be ground.

SUMMARY OF THE INVENTION

With these problems in mind, therefore, it is the primary object of the present invention to provide a magnetostrictive stress measurement apparatus which can simultaneously measure the magnitudes and directions of both axial and torsional stresses produced in a shaft.

To achieve the above-mentioned object, a magnetostrictive stress measurement apparatus for detecting stresses produced in a shaft made of magnetostricitve material and provided with first and second sensing segment areas formed separately in mirror symmetrical arrangement along an outer circumferential surface thereof, according to the present invention, comprises: (a) first coil means provided around the first sensing segment area; (b) first detecting means, connected to said first coil means, for detecting change in inductance of said first coil means due to stresses caused by an axial force and a torque applied to the shaft; (c) second coil means provided around the second sensing segment area; (d) second detecting means, connected to said second coil means, for detecting change in inductance of said second coil means due to stresses caused by the axial force and the torque applied to the shaft; and (e) calculating means, connected to said first and second detecting means, for calculating an addition of a first coil inductance change detected by said first detecting means and a second coil inductance change detected by said second detecting means to obtain magnitude and direction of an axial stress produced in the shaft and for calculating a subtraction between a first coil inductance change detected by said first detecting means and a second coil inductance change detected by said second detecting means to obtain magnitude and direction of a torsional stress produced in the shaft.

In the measurement apparatus of the present invention, it is possible to simultaneously measure both axial and torsional stresses produced in a shaft to be measured. Therefore, when this measurement apparatus of the present invention is mounted on an industrial robot grinding work, for instance, it is possible to simultaneously control a torque and an axial force both applied to a grinding shaft for providing better grinding conditions of a grinding stone against a workpiece.

BRIEF DESCRIPTION OF THE DRAWINGS

FIG. 5 is a basic block diagram of a second embodiment of the magnetostrictive stress measurement apparatus of the present invention;

DETAILED DESCRIPTION OF THE PREFERRED EMBODIMENTS

Figure 1:
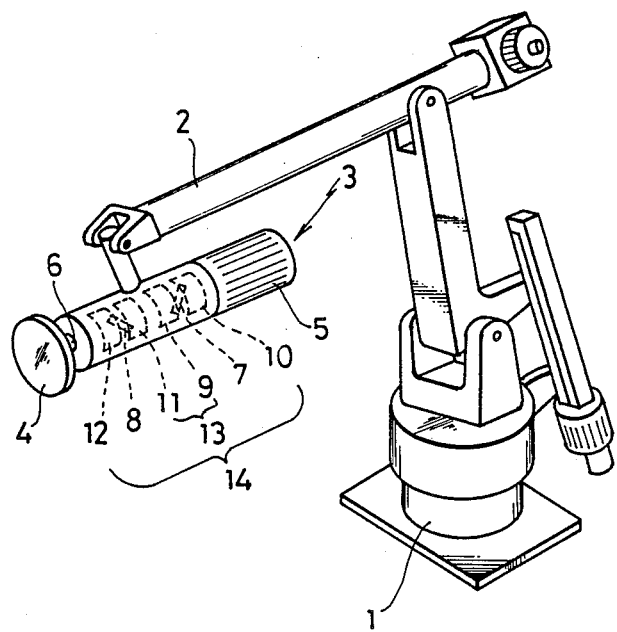
FIG. 1 is a perspective view showing an industrial robot to which the magnetostrictive stress measurement apparatus of the present invention is applied.

In FIG. 1, a magnetostrictive stress measurement apparatus of the present invention can be applied to a grinder unit 3 pivotally supported by an arm 2 of an industrial robot 1, for instance, in order to measure the magnitudes and directions of both axial and torsional stresses produced in a driven shaft 6 of a grinder motor 5. In response to the measured axial and torsional stresses, that is, the measured axial force and torque, rotational speed of the grinder motor 5 and pressure applied to a grinding stone 4 via the robot arm 2 can both be controlled into appropriate grinding conditions.

Figure 2:
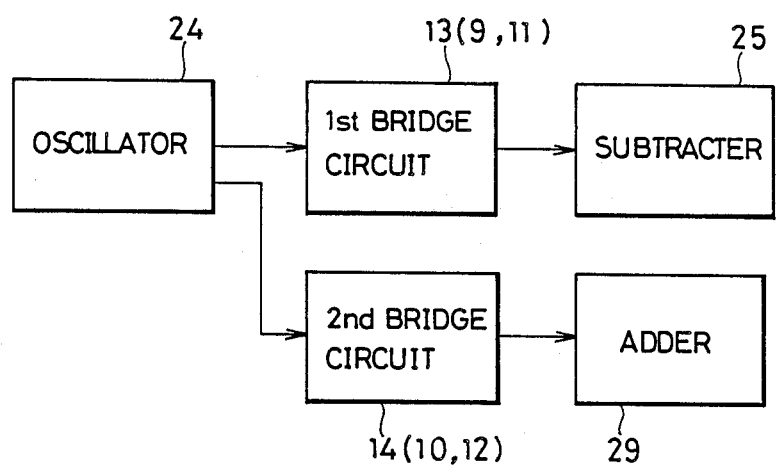
FIG. 2 is a basic block diagram of a first embodiment of the magnetostrictive stress measurement apparatus of the present invention.

With reference to FIGS. 1 and 2, a first embodiment of the measurement apparatus of the present invention comprises an oscillator 24; a first bridge circuit 13 including first and third coils 9 and 11; a second bridge circuit 14 including second and fourth coils 10 and 12; a subtractor 25 and an adder 29.

Figure 3:
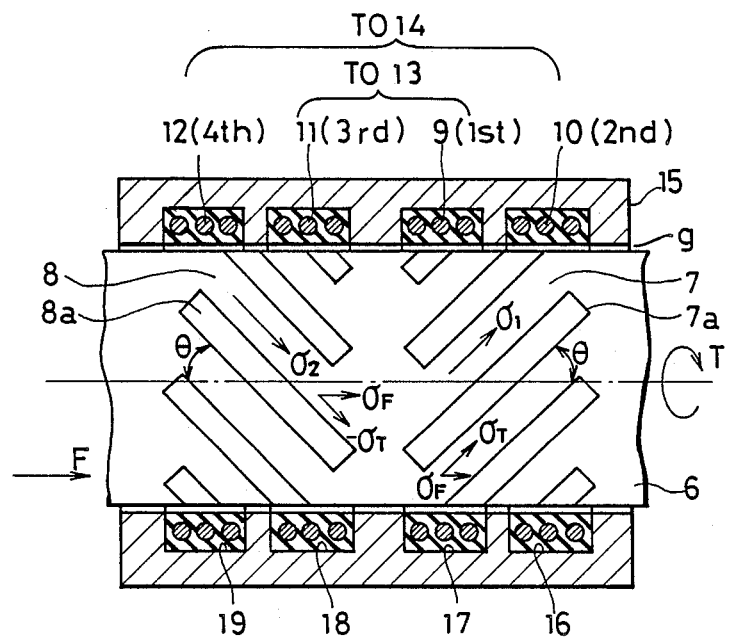
FIG. 3 is a diagrammatical illustration showing four coil elements of the apparatus shown in FIG. 2, which are arranged around a shaft to be measured.

As depicted in FIG. 3, a first sensing segment area 7 is provided by forming plural grooves 7a on the outer circumferential surface of the motor drive shaft 6 at an inclination angle $\theta$(e.g. 45 degrees) with respect to the axial direction thereof. Similarly, a second sensing segment are 8 is provide by forming plural grooves 8a on the outer circumferential surface of the motor driven shaft 6 at an inclination angle $\theta$(e.g. 45 degrees) with respect to the axial direction thereof, so as to form a V-shaped mirror symmetrical arrangement in association with the first sensing segment area 7. In this embodiment, the motor driven shaft 6 to be measured is made of a material with magnetostrictive effect.

The relationship between external forces (an axial force and a torque) and internal stresses (axial and torsional stresses) will be descirbed with reference to FIG. 3.

When a torque T is applied to shaft 6, a stress $\sigma_T$ is produced along the grooves 7a at the first segment area 7, while another stress $-\sigma_T$ is produced along the grooves 8a at the second segment area 8. Further, when an axial force F is applied to the shaft 6, a stress $\sigma_F$ is produced in the axial direction of the shaft 6 at both the segment areas 7 and 8. Therefore, when a torque T and an external force F are simultaneously applied to the shaft 6, resultant stress $\sigma_1$ is produced along the grooves 7a of the first segment area 7 and a resultant stress $\sigma_2$ ($-\sigma_1$) is produced along the frooves 8a of the second segment area 8 as follows:

$$\sigma_1 = \sigma_T + \cos\theta \cdot \sigma_F = \sigma_T + \cos 45° \cdot \sigma_F \quad (1)$$

$$\sigma_2 = -\sigma_T + \cos\theta \cdot \sigma_F = -\sigma_T + \cos 45° \cdot \sigma_F \quad (2)$$

The subtraction and addition of the above two equations are $$\sigma_1 - \sigma_2 = 2\sigma_T \quad (3)$$

$$\sigma_1 + \sigma_2 = 2\cos\theta\sigma_F = 2\cos 45° \sigma_F \quad (4)$$

Here, since the shaft 6 is made of a magnetostrictive material, when an internal stress is produced in the shaft and therefore an internal strain S is produced in the shaft under the condition that the magnetization M is constant (coil current is constant), the magnetic field H varies in accordance with a magnetostrictivity $\Gamma$ of the material as $$\Gamma = \leq H/S \text{ (M: constant)}$$

Since the magnetic field H within the coil changes, the inductance of the coil will be changed.

As shown in FIG. 3, the first coil and the second coil 10 are provided so as to surround the first sensing segment area 7 with a gap g there between, to detect the stress $\sigma_1$ as a change in inductance $L_1$ or $L_2$, respectively. On the other hand, the third coil 11 and the fourth coil 12 are provided so as to surround the second sensing segment area 8 with a gap g therebetween, to detect the stress $\sigma_2$ as a change in inductance $L_3$ and $L_4$, respectively.

In pratice, these four coils 9, 10, 11 and 12 are arranged in four inner cylindrical recesses 16, 17, 18 and 19 formed in a cyclindrical yoke 15, separately, as shown in FIG. 3.

Therefore, when current is passed through the first or second coil 9 or 10, independently, a magnetic circuit is formed around each coil cross section by way of the yoke 15, the air gap g, the first sensing segment area 7, the air gap g again and the yoke 15, so that the shaft 6 is magnetized. On the other hand, when current is passed through the third or fourth coil 11 or 12, independently, a magnetic circuit is formed around each coil cross section by way of the yoke 15, the air gap g, the second sensing segment area 8, the air gap g again and the yoke 15, so that the shaft 6 is also magnetized.

Figures 4A, 4B:
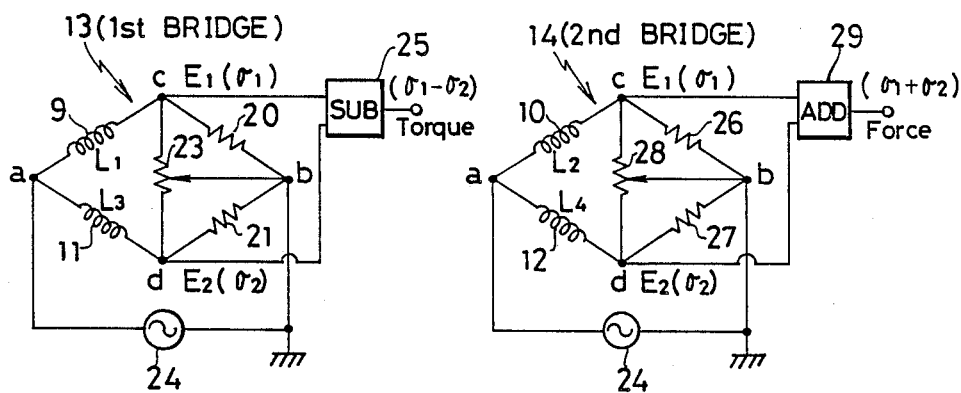
FIG. 4(A) is a circuit diagram showing a first bridge circuit of the apparatus shown in FIG. 2.
FIG. 4(B) is a circuit diagram showing a second bridge circuit of the same apparatus shown in FIG. 2.

As shown in FIG. 4(A), the first bridge circuit 13 comprises the first coil 9, the third coil 11, two resistors 20 and 21, a variable resistor 23 for balance adjustment, an ac power supply (oscillator) 24 connected between a two-coil junction point a and a two-resistor junction point b as an ac source (coil exciting oscillator), and a subtracter 25 connected between two junction points c and d. Therefore, whenever the inductances $L_1$ and $L_3$ of the first and third coils 9 and 11 change, a voltage change corresponding thereto can be obtained between two output points c and d, and a subtraction between the two output points c and d can be outputted from the subtractor 25 as a voltage signal indictive of a torsional stress $\sigma_T = (\sigma_1 - \sigma_2)/2$.

As shown in FIG. 4(B), the second bridge circuit 14 comprises a second coil 10, the fourth coil 12, two resistors 26 and 27, a variable resistor 28 for balance adjustment, an ac power supply 24 connected between a two-coil junction point a and a two-resistor junction point b as an ac source (coil exciting oscillator), and a adder 29 connected between two junction points c and d. Therefore, whenever the inductances $L_2$ and $L_4$ of the second and fourth coils 10 and 12 change, a voltage change corresponding thereto can be obtained between two output points c and d, and as addition between the two output points c and d can be outputted from the adder 29 as a voltage signal indicative of an axial stress $\sigma_F = (\sigma_1 + \sigma_2)/2\cos 45°$.

In operation, after the first bridge circuit 13 has been balanced by adjusting the variable resistor 23 and the second bridge circuit 14 has been balanced by adjusting the variable resistor 28, the grinder unit 3 is driven for grinding work. When a torque T and an axial force F are applied to the driven shaft 6 of the grinding unit 3, since stresses $\sigma_1$ and $\sigma_2$ are produced along the grooves 7a and 8a of the first and second sensing segments areas 7 and 8 and the driven shaft 6 is made of magnetostrictive material (such as nickel, Fe-Al alloy, Fe-Ni alloy, Fe-Co alloy, etc.), magnetic characteristics (e.g. permeability) of the driven shaft 6 change and therefore the four inductances $L_1$ to $L_4$ of the four coils 9 to 12 change.

As a result, since the balanced conditions of the first and second bridge circuits 13 and 14 are lost, a voltage is produced between the two junction points c and d according to changes in inductances $L_1$ and $L_3$ or $L_2$ and $L_4$. In this embodiment, the voltage $\dot{E}_1$ at the output point c in the first and second bridge circuits 13 and 14 is subjected to the influence of stress $\sigma_1$ to the first sensing segment area 7, while the voltage $E_2$ at the output point d in the first and second bridge circuits 13 and 14 is subjected to the influence of stress $\sigma_2$ at the second sensing segment area 8.

Therefore, in the first bridge circuit 13, $E_1 - E_2 = \sigma_1 - \sigma_2 = 2\sigma_T$ can be outputted from the subtractor 25, which indicates the magnitude and the direction of the torsional stress produced in the driven shaft 6. On the other hand in the second bridge circuit 14, $E_1 + E_2 = \sigma_1 + \sigma_2 = 2\cos\theta\sigma_F$ can be outputted from the adder 29, which indicates the magnitude and the direction of the axial stress produced in the driven shaft 6.

With reference to FIGS. 5 to 8, a second embodiment of the measurement apparatus of the present invention will be explained hereinbelow: The apparatus comprises an oscillator 24; a first bridge circuit 113 including a first coil 109; a second bridge circuit 114 including a second coil 110; a first amplifier 125; a second amplifier 129; and a calculator 135 including a positive/negative determining section 130 and a calculating section 131 composed of a microcomputer, for instance.

Figure 6:
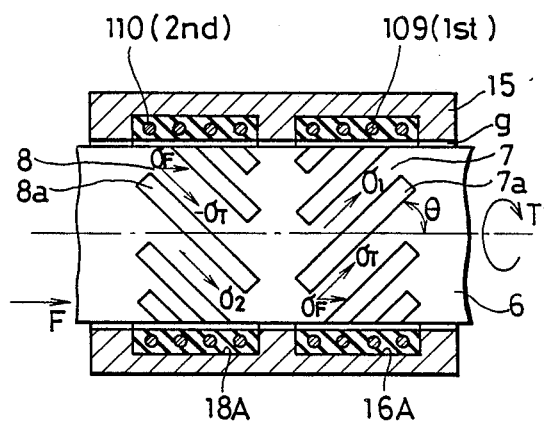
FIG. 6 is a diagrammatical illustration showing two coil elements of the apparatus shown in FIG. 5, which are arranged around a shaft to be measured.

As shown in FIG. 6, the first coil 109 is provided so as to surround the first sensing segment area 7 with a gap g therebetween, to detect the stress $\sigma_1$ as a change in inductance $L_{10}$. On the other hand, the second coil 110 is provided so as to surround the second sensing segment area 8 with a gap g therebetween, to detect the stress $\sigma_2$ as a change in inductance $L_{20}$.

In practice, these two coils 109 and 110 are arranged in two inner cylindrical recesses 16A and 18A formed in a cylindrical yoke 15, separately, as shown in FIG. 6.

Therefore, when current is passed through the first coil 109, a magnetic circuit is formed around the coil cross section by way of the yoke 15, the air gap g, the first sensing segment area 7, the air gap g again and the yoke 15, so that the shaft 6 is magnetized. On the other hand, when current is passed through the second coil 110, a magnetic circuit is formed around the coil cross section by way of the yoke 15, the air gap g, the second sensing segment area 8, the air gap g again and the yoke 15, so that the shaft 6 is also magnetized.

Figures 7A, 7B:
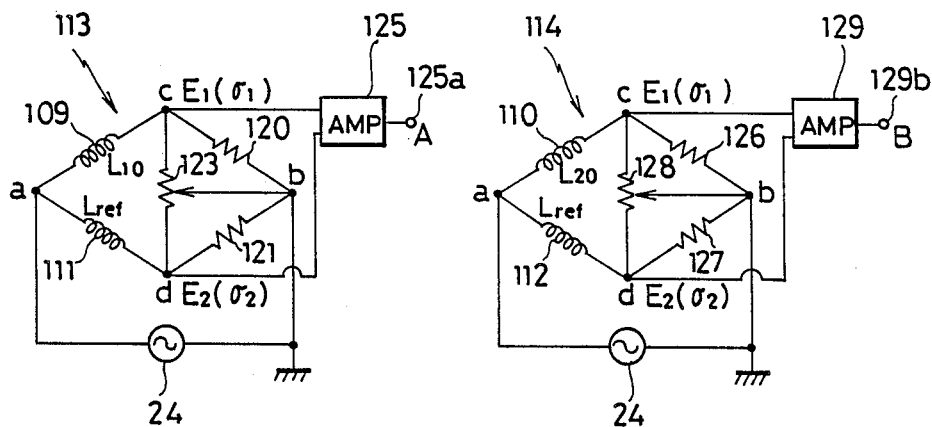
FIG. 7(A) is a circuit diagram showing a first bridge circuit of the apparatus shown in FIG. 5.
FIG. 7(B) is a circuit diagram showing a second bridge ciruit of the apparattus shown in FIG. 5.

As shown in FIG. 7(A), the first bridge circuit 113 comprises the first coil 109 a first reference coil 111, two resistors 120 and 121, a variable resistor 123 for balance adjustment, an ac power supply 24 connected between a two-coil junction point a and b a two-resistor junction point b as an ac source (coil exciting oscillator), and an amplifier 125 connected between two junction points c and d. Therefore, the inductance $L_{10}$ of the first coil 109 changes, a voltage change corresponding thereto can be obatined between two output points c and d, and outputted as a signal A after amplified through the amplifier 125.

As shown in FIG. 7(B), the second bridge circuit 114 comprises the second coil 110, a second reference coil 112, two resistors 126 and 127, a variable resistor 128 for balance adjustment, an ac power supply 24 connected between a two-coil junction point a and a two-resistor junction point b as an ac source (coil exciting oscillator), and an amplifier 129 connected between two junction points c and d. Therefore, whenever the inductance $L_{20}$ of the second coil 110 changes, a voltage change corresponding thereto can be obtained between two output points c and d, and outputted as a signal B after amplified through the amplifier 129.

In operation, after the first and second bridge circuits 113 and 114 have been balanced by adjusting the variable resistors 123 and 128, respectively, the grinder unit 3 is driven for grinding work. When a torque T and an axial force F are applied to the driven shaft 6 of the grinding unit 3, since $\sigma_1$ and $\sigma_2$ are produced along the grooves 7a and 8a formed at the first and second sensing segment areas 7 and 8, the magnetic characteristics (e.g. permeability) of the driven shaft change and therefore the two inductances $L_{10}$ and $L_{20}$ of the two coils 109 and 110 change.

As a result, since the balanced conditions of the first and second bridge circuits 113 and 114 are lost, voltages are produced between the two junction points c and d of the two bridge circuits 113 and 114, respectively, according to changes in inductance $L_{10}$ and $L_{20}$, as described in more detail below:

The inductances $L_{10}$ and $L_{20}$ of the first and second coils 109 and 110 change according to the stresses $\sigma_1$ and $\sigma_2$ produced at the first and second sensing segment areas 7 and 8 as tabulated in Table 1 below, for instance.

TABLE 1

|  | Change of $L_{10}$ | Change of $L_{20}$ |
|---|---|---|
| Clockwise torque | Increase | Decrease |
| Counterclockwise torque | Decrease | Increase |
| Tension | Decrease | Decrease |
| Compression | Increase | Increase |

Under these conditions, the signs (positive and negative) of the output voltages A and B of the first and second bridge circuits 113 and 114 are determined as tabulated in Table 2 below.

TABLE 2

|  | Output A of 1st bridge 113 | Output B of 2nd bridge 114 |
|---|---|---|
| Clockwise torque | − | + |
| Counterclockwise torque | + | − |
| Tension | + | + |
| Compression | − | − |

The above-mentioned two outputs A and B of the two bridges 113 and 114 are given to the calculator 135 after having been amplified through the two amplifiers 125 and 129, respectively.

Figure 8:
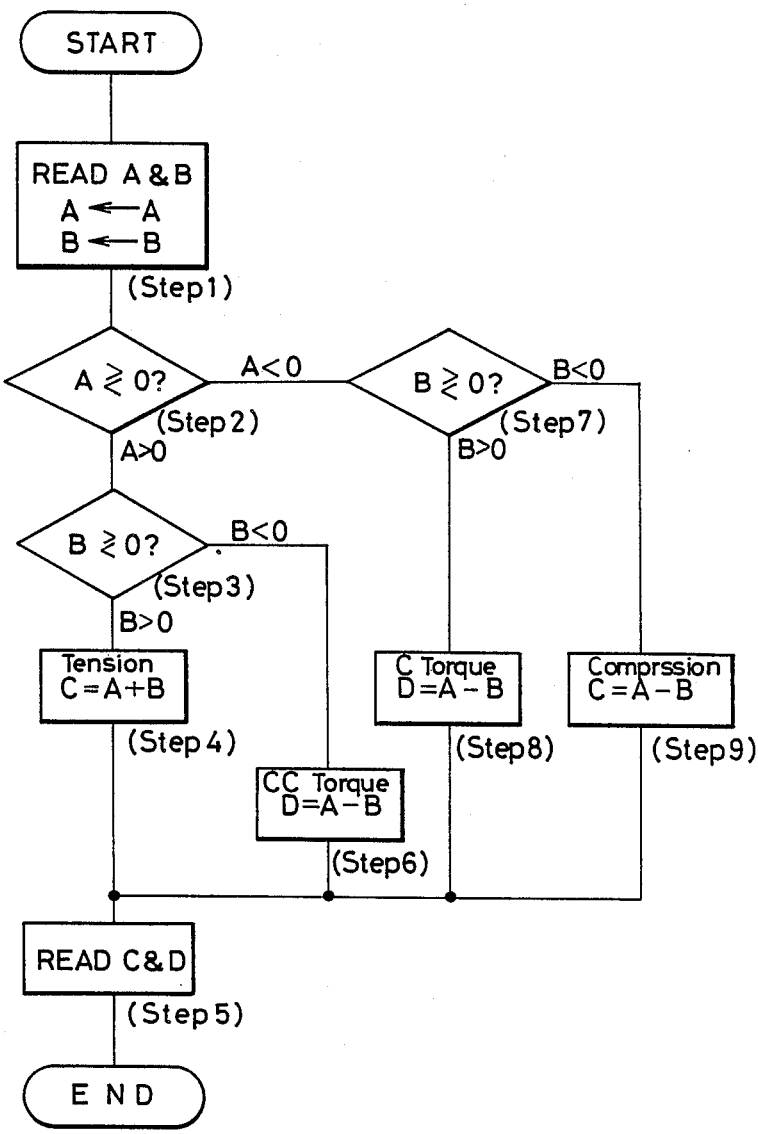
FIG. 8 is a flowchart for assistance in explaining the operation of the apparatus shown in FIG. 5.

In this calculator 135, the positive/negative determining section 130 determines the sign (positive and negative) of these two outputs A and B, and the calculating section 131 calculates an addition or a subtraction of two output voltages A and B in accordance with a flowchart as shown in FIG. 8.

That is, when a torque T and an axial force F are applied to the motor driven shaft 6 of the grinder unit 3 during grinding work, the inductions $L_{10}$ $L_{20}$ of the first and second coils 109 and 110 change, so that two output voltages A and B can be obtained by the first and second bridge circuits 113 and 114 and then given to the calculator (controller) 135.

Control first reads output voltages A and B (in step 1) and determines whether the output voltage A is positive or negative (in step 2). If determined positive (plus), control next determines whether the output voltage B is positive or negative (in step 3). If determined positive (plus), control adds the two outputs A and B to obtain a voltage signal C (in step 4), and records this added result C=A+B as a value indicative of a tension (in step 5). If the output voltage B is determined negative (minus) (in step 3), control subtracts the output B from the output A to obtain a voltage signal D (in step 6) and records this subtracted result D=A−B as a value indicative of a counterclockwise torque (in step 5). Further, if the output voltage A is determined negative (minus)

(in step 2), control determines whether the output voltage B is positive or negative (in step 7). If determined positive, control subtracts the output B from the output A to obtain a voltage signal D (in step 8) and records this subtracted result D=A−B as a value indicative of a clockwise torque (in steps 5). If the output voltage B is determined negative (in step 7), control adds the two output voltages A and B to obtain a voltage signal C (in step 9) and records this added result C=A+B as a value indicative of a compression (in step 5), completing a series of calculating operations.

Under the conditions as listed in Tables 1 and 2, the signs of the calculated voltage signals C and D indicate the directions of the force or torque as tabulated in Table 3 below.

TABLE 3

|   | + | − |
|---|---|---|
| C | Tension | Compression |
| D | Counterclockwise torque | Clockwise torque |

In this second embodiment, since changes in self-inductances $L_{10}$ and $L_{20}$ of the first and second coils 109 and 110 can be detected to measure the stresses $O_1$ and $O_2$, it is possible to reduce the size and simplify the structure as compared with the first embodiment.

In the magnetostrictive stress measurement apparatus of the present invention, since the motor driven shaft 6 itself is made of a magnetostrictive material and formed with the two sensing segment areas 7 and 8 provided on the same material circumferential surface with a plurality of grooves, the stress detection precision is high as compared with the pripr-art apparatus in which magnetostrictive films are bonded on the surface of the shafte to be measured by a bonding agent which is easily subjected to harmful influence of alternate torque and temperature changes.

The present invention is not limited to the above-mentioned embodiments. For instance, it is possible to increase the number of grooves 7a or 8a for providing higher sensitivity and to fill the grooves 7a and 8a with non-magnetostrictive material for improving the yoke strength. Further, it is also possible to form the first and second sensing segment areas in convex shape on the outer circumferential surface of the shaft.

As described above, in the measuring apparatus of the present invention, it is possible to simultaneously measure both the axial and torsional stresses of the shaft to be measured by addition of the two output voltages of the first bridge circuit or by subtraction of the two output voltages of the second bridge circuit. In the present invention, since all the coils are arranged as to provide each self-inductance, it is possible to reduce the axial length of each coil, as compared with the prior-art apparatus in which the exciting and detecting coils are so arranged as to provide a mutual inductance.

In particular, when the measuring apparatus of the present invention is applied to an industrial robot for grinding work, since both the torque and the axial force applied to grinderr shaft can be measured simultaneously, it is possible to improve the workability by controlling various grinding conditions such as grinding sharpness quality, grinding pressure, etc. without depending upon the detecting function of the robot itself.

What is claimed is:

1. A magnetostrictive stress measurement apparatus for detecting stresses produced in a shaft made of magnetostrictive material and provided with first and second sensing segment areas formed separately in mirror symmetrical arrangement along an outer circumferential surface thereof, comprising:
   (a) first coil means provided around the first sensing segment area;
   (b) first detecting means, connected to said first coil means, for detecting change in inductance of said first coil means due to stresses caused by an axial force and a torque applied to the shaft;
   (c) second coil means provided around the second sensing segment area;
   (d) second detecting means, connected to said second coil means, for detecting change in inductance of said second coil means due to stresses caused by the axial force and the torque applied to the shaft; and
   (e) calculating means, connected to said first and second detecting means, for calculating an addition of a first coil inductance change detected by said first detecting means and a second coil inductance change detected by said second means to obtain magnitude and direction of an axial stress produced in the shaft and for calculating a subtraction between a first coil inductance change detected by said first detecting means and a second coil inductance change detected by said second detecting means to obtain magnitude and direction of a torsional stress produced in the shaft.

2. The magnetostrictive stress measurement apparatus of claim 1, wherein said first detecting means is a first bridge circuit including a first reference inductance to detect change in inductance of said first coil means in association with the first reference inductance, and wherein said second detecting means is a second bridge circuit including a second reference inductance to detect change in inductance of said second coil means in association with the second reference inductance.

3. The magnetostrictive stress measurement apparatus of claim 1, wherein said first detecting means is a first bridge circuit thied coil means provided around the second sensing segment area to detect change in inductance of said first coil means in association with said third coil means and wherein said second detecting means is a second bridge circuit including fourth coil means provided around the first sensing segment area to detect change in inductance of said second coil means in association with said fourth coil means.

4. A magnetostrictive stress measurement apparatus for detecting stresses produced in a shaft made of magnetostrictive material and provided with first and second sensing segment areas formed separately in mirror symmetrical arrangment along an outer circumferential surface thereof, comprising:
   (a) first and second coils provided around the first sensing segment area;
   (b) third and fourth coils provided around the second sensing segment area;
   (c) a first bridge circuit including said first and third coils, for detecting change in inductance of said first coil in association with said third coil;
   (d) a second bridge circuit including said second and fourth coils, for detecting change in inductance of said second coil in association with said fourth coil;
   (e) a subtracter, connected to said first bridge circuit, for calculating a subtraction between a first coil inductance change and a third coil inductance change both detected by said first bridge to obtain magnitude and direction of a torsional stress produced in the shaft; and (d) an adder, connected to said second bridge circuit, for calculating an addition of a second coil inductance change and a fourth coil inductance change both detected by said second bridge to obtain magnitude and direction of an axial stress produced in the shaft.

5. A magnetostrictive stress measurement apparatus for detecting stresses produced in a shaft made of magnetostrictive material and provided with first and second sensing segment areas formed separately in mirror symmetrical arrangement along an outer circumferential surface thereof, comprising:
 (a) a first coil provided around the first sensing segment area;
 (b) a first reference coil;
 (c) a second coil provided around the second sensing segment area;
 (d) a second reference coil;
 (e) a first bridge circuit including said first coil and said first reference coil to detect a first coil inductance change in association with a first reference coil inductance;
 (f) a second bridge circuit including said second coil and said second reference coil to detect a second coil inductance change in association with a second reference coil inductance;
 (g) a calculator, connected to said first and second bridge circuits, for calculating an addition of the first coil inductance change detected by said first bridge circuit and the second coil inductance change detected by said second bridge circuit to obtain magnitude and direction of an axial force produced in the shaft and for calculating a subtraction between the first coil inductance change detected by said first bridge circuit and the second coil inductance change detected by said second bridge circuit to obtain magnitude and direction of a torsional stress produced in the shaft.

* * * * *